(12) United States Patent
Hong (10) Patent No.: US 11,167,793 B2
(45) Date of Patent: Nov. 9, 2021

(54) APPARATUS AND METHOD FOR CONTROLLING OF STEER BY WIRE SYSTEM

(71) Applicant: MANDO CORPORATION, Gyeonggi-do (KR)

(72) Inventor: SeungGyu Hong, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 247 days.

(21) Appl. No.: 16/417,411

(22) Filed: May 20, 2019

(65) Prior Publication Data
US 2019/0367084 A1 Dec. 5, 2019

(30) Foreign Application Priority Data

May 29, 2018 (KR) .................. 10-2018-0061343

(51) Int. Cl.
*B62D 6/00* (2006.01)
*B62D 5/04* (2006.01)
*B62D 15/02* (2006.01)

(52) U.S. Cl.
CPC ........... *B62D 6/008* (2013.01); *B62D 5/0469* (2013.01); *B62D 15/0225* (2013.01)

(58) Field of Classification Search
CPC .. B62D 6/008; B62D 5/0469; B62D 15/0225; B62D 5/006; B62D 5/046; B62D 5/0463
See application file for complete search history.

(56) References Cited

U.S. PATENT DOCUMENTS

| | | | | |
|---|---|---|---|---|
| 2003/0114969 A1* | 6/2003 | Dominke | ............. | B62D 5/0493 701/41 |
| 2004/0007416 A1* | 1/2004 | Furumi | ................ | B62D 5/0409 180/443 |
| 2004/0104066 A1* | 6/2004 | Sakai | ................... | B62D 5/0469 180/402 |
| 2009/0105907 A1* | 4/2009 | Yamaguchi | ............ | B62D 6/002 701/41 |
| 2010/0318264 A1* | 12/2010 | Maeda | ................... | B62D 6/008 701/42 |
| 2018/0141553 A1* | 5/2018 | Katayama | ............. | B60W 10/20 |
| 2018/0334184 A1* | 11/2018 | Jin | ....................... | B62D 5/0463 |

* cited by examiner

*Primary Examiner* — Mary Cheung
(74) *Attorney, Agent, or Firm* — Ladas & Parry, LLP (57) ABSTRACT

The present disclosure relates to a steering control apparatus and method of the steer-by-wire system including a sensing information collector for collecting at least one of sensing information on a steering or sensing information on a rack, a motor operation determiner for determining a start of a motor limiting mode for a reaction force motor and an end of the motor limiting mode for the reaction force motor which provides a reaction torque to a steering wheel based on the collected sensing information, a control signal generator for generating a control signal corresponding to the start of the motor limiting mode or the end of the motor limiting mode based on the determined result, and a control signal output for outputting the generated control signal to the reaction force motor.

18 Claims, 8 Drawing Sheets

⊗ Input Direction   ⊙ Output Direction

APPARATUS AND METHOD FOR CONTROLLING OF STEER BY WIRE SYSTEM

CROSS REFERENCE TO RELATED APPLICATION

This application claims priority from Korean Patent Application No. 10-2018-0061343, filed on May 29, 2018, which is hereby incorporated by reference for all purposes as if fully set forth herein.

BACKGROUND OF THE INVENTION

1. Field of the Invention

The present disclosure relates to a steering control apparatus and method for a steer-by-wire system, and more particularly, to a steering control apparatus and a control method for controlling a reaction force motor of a steering wheel, thereby limiting a rack stroke.

2. Description of the Prior Art

The steering-by-wire system is a steering system which eliminates the mechanical connection structure between the steering wheel and the vehicle wheel, constitutes the actuators on both vehicle wheels, thereby controls the actuator by an electrical signal according to the rotation of the steering wheel.

Specifically, the steer-by-wire type steering system may comprise a steering wheel directly operated by a driver for steering, a reaction force motor provided on one side of the steering wheel for providing a reaction torque according to the rotation for steering, a gear box for performing a steering action by linearly moving the steering shaft, a sensor for detecting a torque change and a steering angle according to the rotation of the steering wheel, and a vehicle speed, and an ECU (electronic control unit) for operating a gear box, an actuator, and a reaction force motor in accordance with an electric signal applied from a sensor. Here, the reaction force motor is installed on one side of the steering shaft connected with the steering wheel to generate a force in a direction opposite to the rotation of the steering wheel, thereby giving a proper steering feeling to the driver.

In a rack-pinion type steer-by-wire system generally used, in the case that the driver turns the steering wheel to one end, the stoppers of the rack bar and the ends of the gearbox housing may contact each other, and a collision due to the inertial motion of the rack may occur. As a result, noise and vibration of the vehicle may be generated, thereby causing a discomfort to the driver and shortening the life of the vehicle due to mechanical damage Particularly, in the case that an external force acts on the vehicle, for example, in the case that the friction force of the road surface is reduced due to a foreign substance on the road surface or the movement of the rack bar is strapped by an obstacle such as a curb stone on the road, the driver may turn the steering wheel to the end until the rack collides Therefore, functions of limiting the rack stroke in the case that the steering angle is controlled by using the steering assist motor of the electric power assist steering device (EPS) may be implemented, and one example of which is a rack end stop function. In the rack end stop function, the rack stroke may be limited by increasing the reaction torque of the electric power assist steering (EPS) in the case of turning the steering wheel to one end or by applying reverse current to the reaction force motor depending on the situation.

However, this prior art may not take into consideration the external force received by the vehicle, and may only provide the same rack stroke control value for a predetermined target steering angle. Therefore, in a situation in which the vehicle receives an external force, the actual steering angle of the vehicle may increase or decrease more than the target steering angle, and as a result, there may be a problem the steering feeling for the driver changes.

In addition, to solve this problem, a method of adding a hardware device to a reaction force motor may have a problem of an increase in production cost. In addition, in the method of applying a strong reverse current to the reaction force motor, there may be a problem that the sense of difference of the driver's steering feeling may increase in applying the strong reverse current.

SUMMARY OF THE INVENTION

For this background, the present disclosure may provide the apparatus and method for controlling reaction force motor of steering wheel to limit rack stroke.

The present disclosure may provide the apparatus and method for preventing rack bar stopper collision and preventing mechanical damage and noise of vehicle by more easily restricting rack stroke.

The present disclosure may provide the apparatus and method for adjusting limited rack stroke for driver's convenience by detecting the steering angle and the motion of the reaction force motor.

The problems to be solved by the present disclosure are not limited to the above-mentioned problems, and other problems not mentioned can be clearly understood by those skilled in the art from the following description.

In accordance with an aspect of the present disclosure, there is provided a steering control apparatus of a steer-by-wire system including: a sensing information collector for collecting at least one of sensing information on a steering or sensing information on a rack; a motor operation determiner for determining a start of a motor limiting mode for a reaction force motor and an end of the motor limiting mode for the reaction force motor which provides a reaction torque to a steering wheel based on the collected sensing information; a control signal generator for generating a control signal corresponding to the start of the motor limiting mode or the end of the motor limiting mode based on the determined result; and a control signal output for outputting the generated control signal to the reaction force motor.

In accordance with another aspect of the present disclosure, there is provided a steering control method of a steer-by-wire system including: collecting at least one of sensing information on a steering and sensing information on a rack; determining a start of a motor limiting mode for a reaction force motor and an end of the motor limiting mode for the reaction force motor which provides a reaction torque to a steering wheel based on the collected sensing information; generating a control signal corresponding to the start of the motor limiting mode or the end of the motor limiting mode based on the determined result; and outputting the generated control signal to the reaction force motor.

Other particulars of the disclosure may be included in the detailed description and drawings.

As described below, according to the present disclosure, it is possible to provide convenience to the driver by reducing the damage of the vehicle by effectively restricting the rack stroke.

Further, there is an effect that the behavior of the vehicle can be stably controlled while minimizing the sense of difference according to the steering change of the steering wheel.

DETAILED DESCRIPTION OF THE EXEMPLARY EMBODIMENTS

In the following description of examples or embodiments, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can"

Hereinafter, the steering control apparatus according to the present embodiments will be described with reference to the accompanying drawings.

Figure 1:
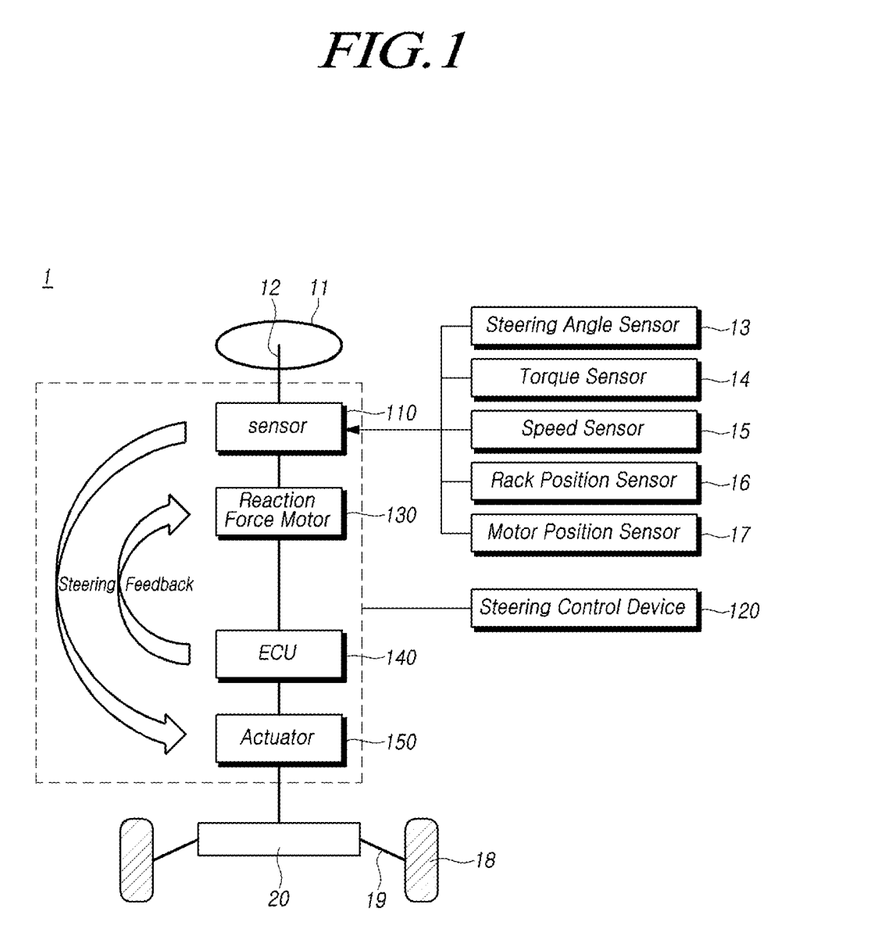
FIG. 1 is a schematic diagram illustrating an example of a steer-by-wire system.

FIG. 1 is a schematic diagram illustrating an example of a steer-by-wire system 1.

Referring to FIG. 1, The steering-by-wire system 1 including the steering control device 120 according to the present disclosure may comprise a steering wheel 11, a steering shaft 12 for supporting the steering wheel 11, a reaction force motor 130 that is configured on one side of the steering shaft 12 and is driven by the steering control device 120 and the ECU 140, one or more sensors 110 positioned at one side of the steering shaft 12 or the reaction motor 130 or the rack bar 20 to detect steering information and rack position information, an electronic control unit (ECU) 140 for generating control signals for the steering reaction force and the steering assist force based on the vehicle speed information through an assisting current control map, and one or more actuators 150 that independently steer each of the left wheels and right wheels 18 of the vehicle by the control signal of the ECU.

In the steer-by-wire system 1 having the rack-and-pinion type, the steering torque generated by the rotation of the steering wheel 11 can be transferred to the rack bar 20 through the rack-pinion mechanism portion, and the steering assist force generated in the actuator 150 can be transferred to the left wheels and right wheels 18 through the tie rod 19 and the rack bar 20.

Here, the sensor 110 may comprise at least one of a steering angle sensor 13 for detecting changes in rotation of the steering shaft 12 that vary according to the operation of the steering wheel 11 by the driver, a torque sensor 14 installed at one side of the steering shaft 12 and the reaction force motor 130 for detecting the torque output from the reaction force motor 130, a vehicle speed sensor 15 for detecting the vehicle speed of the vehicle, a rack position sensor 16 located in the rack bar 20 for detecting rack position information, or a motor position sensor 17 for detecting the position of the motor rotor of the reaction force motor 130. Alternatively, the sensor 110 may receive sensing information.

The reaction force motor 130 may be installed on one side of the steering shaft 12 and may generate the steering reaction force against the steering force of the driver applied to the steering wheel 11 in accordance with the control signal applied from the steering control device 120 and the ECU 140 to provide an appropriate steering feeling to the driver. In this specification, the reaction force motor 130 may be represented by a feedback motor.

Specifically, the ECU 140 may generate the signal for controlling the steering reaction force and the steering assist force using the assist current control map based on the sensing information detected by the sensor 110. The ECU 140 may control the operation of the reaction force motor 130 and may control the operation of the actuator 150 that independently steers the left wheels and right wheels 18 to execute steering of the vehicle.

At this case, the rack bar 20 may have a limited range of rack strokes due to the mechanical characteristics of the rack bar. This is because collision with other parts may occur in the case that additional torque is applied at the stroke end state. In particular, the stopper of the rack bar 20 and the end of the gearbox housing may collide. Such a collision may generate noise and vibration of the vehicle, which not only may discomfort the driver but also cause mechanical damage of the vehicle.

Therefore, the steering control device 120 according to the present disclosure may limit the stroke range of the rack to more effectively prevent the collision of the rack stopper, and may execute the motor limiting mode so as to limit the steering assist force.

Although the R-EPS (Rack-type EPS) is illustrated and described as an example of a steer-by-wire system in FIG. 1, but the present embodiment may also be applied to hydraulic EPS, C-EPS (column type EPS), DP-EPS (dual pinion type EPS), and the like.

Figure 2:
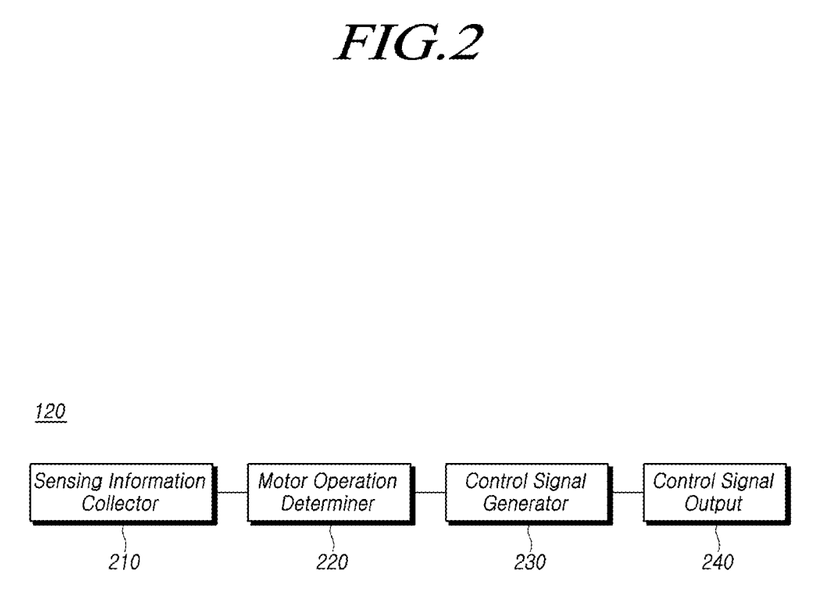
FIG. 2 is a block diagram of a steering control apparatus for a steer-by-wire system according to an embodiment of the present disclosure.

FIG. 2 is a block diagram of a steering control device 120 for a steer-by-wire system 1 according to an embodiment of the present disclosure.

Referring to FIG. 2, the steering control device 120 according to the present disclosure may comprise a sensing information collector 210 for collecting at least one of sensing information about a steering or sensing information about a rack, a motor operation determiner 220 for determining the start of the motor limiting mode and the end of the motor limiting mode for the reaction force motor which provides the reaction torque to the steering wheel, a control signal generator 230 for generating the control signal corresponding to the start of the motor limiting mode and the end of the motor limiting mode, and a control signal output 240 for outputting the generated control signal to the reaction force motor.

In this case, the sensing information about the steering may comprise at least one of reaction torque information of the reaction force motor generated from the torque sensor or the motor position sensor, or steering angle information of the steering wheel generated from the steering angle sensor.

The sensing information about the rack may comprise at least one of a predetermined rack stroke range information or rack position information generated from the rack position sensor.

In this case, if the rack stroke limit range is fixed according to the mechanical design of the vehicle, the rack stroke range information can be stored as a predetermined value. Alternatively, if the rack stroke range is changed in real time, the rack stroke range information may be updated in real time.

More specifically, the sensing information collector 210 may receive at least one of the torque signal generated from the torque sensor or the steering angle signal generated from the steering angle sensor when receiving the steering angle information.

In addition, the rack position sensor may be a sensor for measuring variables related to the movement of the rack, or may be a sensor measuring the position of the rack placed in the housing of the gearbox enclosing the rack bar.

The sensing information collector 210 may collect the sensing information through the various communication networks such as the Integrated Services Digital Network (ISDN), Asymmetric Digital Subscriber Line (ADSL), Local Area Network (LAN), Ethernet, Controller Area Network (CAN), TCP/IP based communication network, optical communication network, a wireless communication network including CDMA and WCDMA a local area network such as Zigbee, Bluetooth.

The motor operation determiner 220 may determine the target steering angle and the position of the rack based on at least one of the steering angle information or the rack position information, and may determine the magnitude of the current applied to the reaction force motor and the angular velocity of the reaction force motor based on the reaction torque information.

In this case, the target steering angle may be determined based on the steering angle by the operation of the driver, which indicates the degree of steering of the steering wheel operated by the driver.

The motor operation determiner 220 may control to start the motor limiting mode in the case that the position of the rack corresponding to the target steering angle is within the threshold range for the rack stroke range.

That is, the threshold range for the rack stroke range may indicate the range of the rack stroke in which the stopper of the rack bar and the gearbox housing can collide with each other. Thus, the condition that the position of the rack corresponding to the target steering angle is within the threshold range for the rack stroke range may mean that collision can occur in the case of steering to the position of the rack corresponding to the target steering angle. Therefore, if the position of the rack corresponding to the target steering angle is within the threshold range, the motor limiting mode may be started.

If the motor operation determiner 220 determines that the motor limiting mode is to be started, the steering control device may perform the end stop function of the rack for limiting the rack stroke range, and at the same time, may output the control signal in accordance with the motor limiting mode to the reaction force motor.

Alternatively, the motor operation determiner 220 may control to terminate or end the motor limiting mode if the position of the rack is not within the threshold range while the motor limiting mode is being performed.

That is, since the position of the rack is at a position where there is no risk of collision between the stopper of the rack bar and the gearbox housing, the motor limiting mode may be terminated or the motor limiting mode may not be executed.

In addition, the motor operation determiner 220 may control to start the motor limiting mode based on at least one of whether the vehicle is started or whether the steering wheel is requested to be locked.

If a failure occurs in the steer-by-wire system 1 and transmission/reception electric signals applied by the sensors is impossible, or if the operation of the reaction force motor is not possible, a steering wheel lock request signal may be received from the ECU. In the case that the steering wheel lock request signal is received, the motor operation determiner 220 may control to start the motor limiting mode.

Alternatively, if the vehicle is in the off state, that is, if the engine ignition of the vehicle is in the off state, the motor operation determiner 220 may start the motor limiting mode. Meanwhile, if the vehicle ignition is turned on, the motor operation determiner 220 may determine the steering angle based on the steering angle information of the steering wheel, may determine the position of the rack based on the rack position information, and determine whether the motor limiting mode is started or terminated based on the steering angle information and the rack position information.

The motor operation determiner starts the motor limiting mode, so that it is possible to prevent the steering wheel from being unnecessarily operated in a situation in which the driving of the vehicle is dangerous.

In this case, the motor limiting mode may be the operation of turning off the three-phase switch of the reaction force motor or the operation of fixing the electrical angle of the reaction force motor. The operation of the motor limiting mode will be described later in detail with reference to FIG. 6 and FIG. 7.

The motor operation determiner 220 may determine at least one of the steering angle direction of the steering wheel, the reaction torque direction and the angular velocity direction of the reaction force motor. In this case, the motor operation determiner 220 can control the motor limiting mode to terminate in the case that the steering angle direction coincides with the reaction torque direction and the angular velocity direction does not coincide with the reaction torque direction.

For example, it is assumed that the clockwise direction in the rotational motion is the positive (+) direction and the counterclockwise direction is the negative (−) direction. If the direction of the steering angle is the positive (+), the direction of the reaction torque of the reaction force motor is positive (+) and the angular velocity direction of the reaction force motor is negative (−), this means that the rack position of the vehicle moves from the threshold range of the rack stroke range corresponding to the target steering angle to the normal range in which the limitation of the rack stroke is not required. That is, the steering direction is returned to the rack center direction. Therefore, the motor operation determiner 220 may terminate or end the motor limiting mode.

Similarly, If the direction of the steering angle is the negative (−), the direction of the reaction torque of the reaction force motor is negative (−) and the angular velocity direction of the reaction force motor is positive (+), it means that the rack position of the vehicle moves from the threshold range to the normal range, so that the motor operation determiner 220 may end the motor limiting mode.

In this manner, the motor operation determiner 220 may automatically start or end the motor limiting mode by detecting the direction of rotation of the steering angle, the reaction torque, and the angular velocity respectively.

The control signal generator 230 may generate the control signal for starting or ending the motor limiting mode and may transfer the control signal to the reaction force motor 130 through the control signal output 240 so that the rack stroke can be easily limited.

The control signal output 240 may output the control signal for increasing by a predetermined ratio or gradually increasing the magnitude of the current applied to the reaction force motor according to the motor limiting mode.

Through the output of such a control signal, the steering heterogeneity generated by the reaction force of the reaction force motor can be minimized during the steering wheel operation, thereby improving the operational convenience.

In addition, the steering control device 120 of the above described steer-by-wire system 1 may be implemented by only the software as the control logic of the reaction force motor without a hardware configuration.

Figure 3:
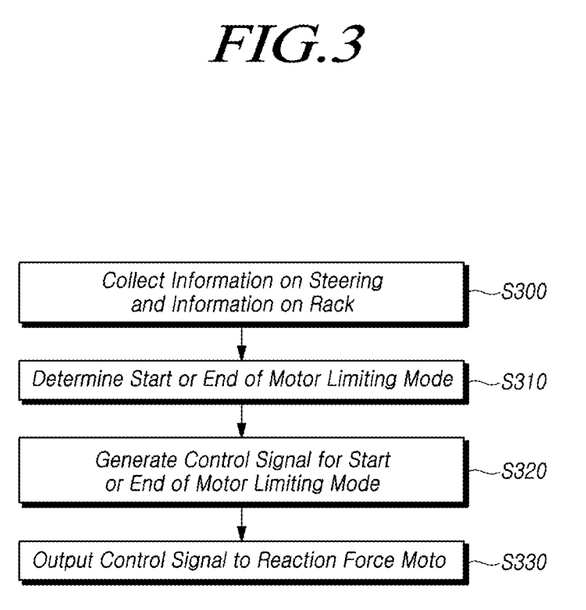
FIG. 3 is a flowchart of a steering control method of a steer-by-wire system according to an embodiment of the present disclosure.

FIG. 3 is a flowchart of a steering control method of a steer-by-wire system according to an embodiment of the present disclosure.

Referring to FIG. 3, the steering control method of the steer-by-wire system according to the present disclosure may comprise the sensing information collection step (S300) of collecting at least one of sensing information on the steering and sensing information on the rack, the motor operation determination step (S310) of determining whether to start the motor limiting mode and end the motor limiting mode for the reaction force motor which provides the reaction torque to a steering wheel, the control signal generating step (S320) for generating a control signal corresponding to the start of the motor limiting mode or the end of the motor limiting mode, and a control signal outputting step (S330) for outputting the generated control signal to the reaction force motor.

Figure 4:
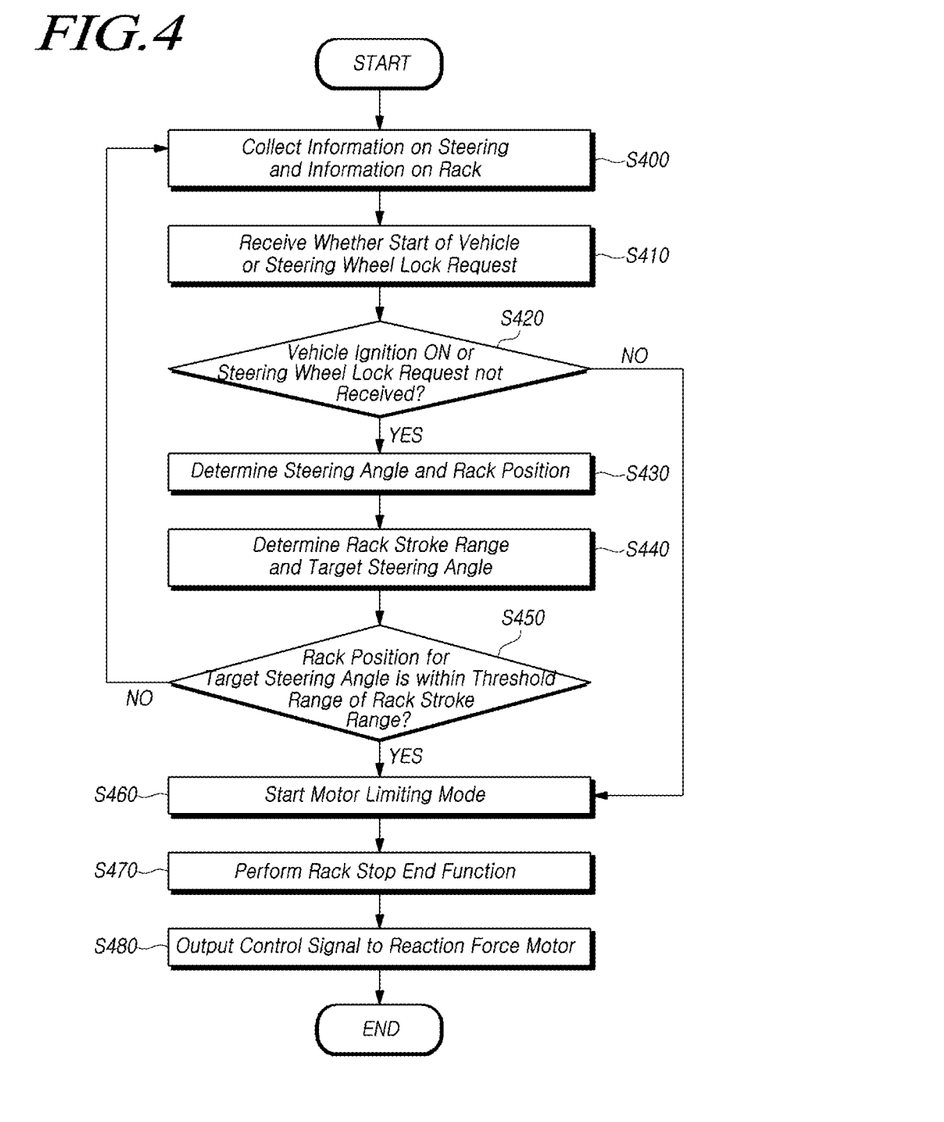
FIG. 4 is a flowchart illustrating a steering control method for starting the motor limiting mode in accordance with an embodiment of the present disclosure.

FIG. 4 is a flowchart illustrating a steering control method for starting the motor limiting mode in accordance with an embodiment of the present disclosure.

In the sensing information collection step S400 of collecting at least one of sensing information on the steering and sensing information on the rack, the sensing information on the steering may comprise at least one of reaction torque information of the reaction force motor generated from a torque sensor or a motor position sensor or steering angle information of the steering wheel generated from the steering angle sensor. The sensing information on the rack may comprise at least one of the predetermined rack stroke range information or rack position information generated from the rack position sensor.

At the same time, it may be received whether the vehicle is started or whether the steering wheel lock request is made (S410).

At this time, the motor limiting mode may be started (S460) if the start of the vehicle is turned off or the steering wheel lock request is received (S460), and the end stop function of the rack for limiting the rack stroke range may be executed (S470), and the control signal corresponding to the motor limiting mode is output to the reaction force motor (S480).

Meanwhile, in the case that the start of the vehicle is turned on or the steering wheel lock request is not received, the steering control device may determine the steering angle based on the steering angle information of the steering wheel, and determine the position of the rack based on the rack position information (S430).

Accordingly, the steering control device may collect and detect the rack stroke range information, and may determine the target steering angle based on the determined steering angle (S430). The steering control device may set the threshold range for the rack stroke range according to the position of the rack.

Subsequently, the steering control device may determine whether the position of the rack corresponding to the target steering angle is within the threshold range (S450), and may control to start the motor limiting mode if the position of the rack is within the threshold range (S460).

In the case that the motor limiting mode is started, the steering control device may perform the end stop function of the rack for limiting the rack stroke range (S470) and may output the control signal according to the motor limiting mode to the reaction force motor (S480).

In this case, it is possible to minimize the sense of difference in steering due to the steering change of the steering wheel by outputting the control signal for increasing by the predetermined ratio or gradually increasing the magnitude of the current applied to the reaction force motor according to the motor limiting mode.

Figure 5:
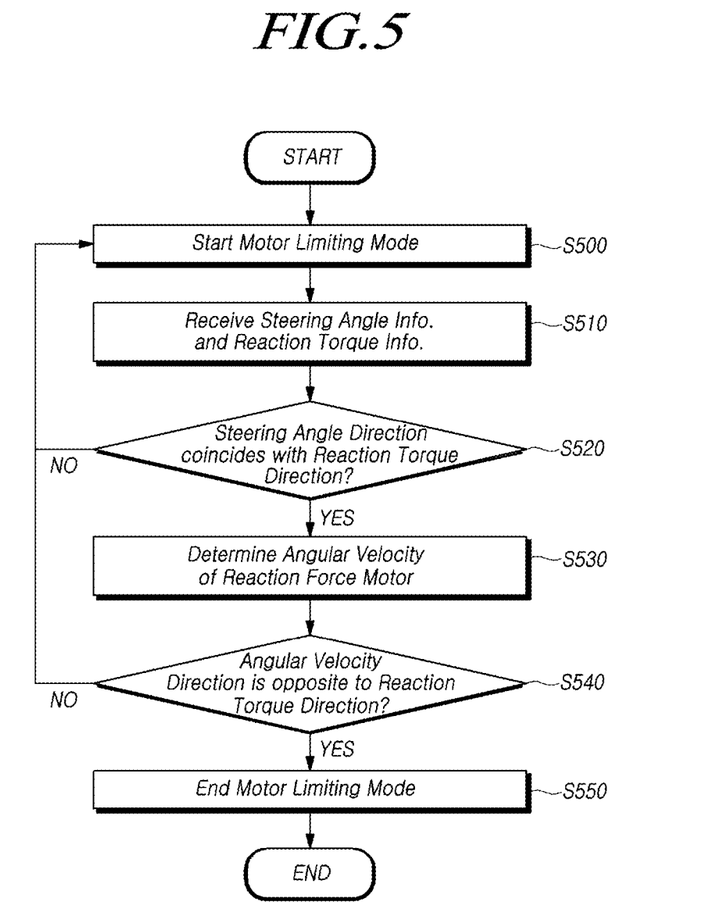
FIG. 5 is a flowchart illustrating a steering control method for terminating the motor limiting mode according to an embodiment of the present disclosure.

FIG. 5 is a flowchart illustrating a steering control method for terminating the motor limiting mode according to an embodiment of the present disclosure.

According to the steering control method of the reaction force motor described above, even if the vehicle is strapped by a road obstacle such as a curb stone or the friction force of the road surface is low, it is possible to effectively prevent the collision of the rack stopper by providing a disturbance to the steering wheel operation of the vehicle driver.

Referring to FIG. 5, in the case that the reaction force motor is operated in the motor limiting mode (S500), the steering control device may receive information on the steering angle and information on the reaction torque (S510). This information may be collected from at least one of the reaction torque signal and the steering angle signal generated from the steering angle sensor, a torque sensor, and the like provided in the reaction force motor.

The steering control device may determine the direction of the steering angle signal of the vehicle and the direction of the reaction torque signal of the reaction force motor. More specifically, the steering control device may determine whether the direction of the steering angle signal and the direction of the reaction torque signal coincide with each other (S520).

If the direction of the reaction torque signal coincides with the direction of the steering angle signal, the steering control device may determine the angular velocity of the reaction force motor by using the torque sensor or the motor position sensor (S530).

The steering control device may determine whether the determined the direction of the angular velocity is inconsistent with the direction of the reaction torque signal, that is, whether the angular velocity direction of the reaction force motor is opposite to the reaction torque direction. If the angular velocity direction of the reaction force motor and the reaction torque direction are opposite to each other, the steering control device may control to terminate or end the motor limiting mode (S550).

For example, it is assumed that the clockwise direction in the rotational motion is the positive (+) direction and the counterclockwise direction is the negative (−) direction. If the direction of the steering angle is the positive (+), the direction of the reaction torque of the reaction force motor is positive (+) and the angular velocity direction of the reaction force motor is negative (−), this means that the rack position of the vehicle moves from the threshold range of the rack stroke range corresponding to the target steering angle to the normal range in which the limitation of the rack stroke is not required. That is, the steering direction is returned to the rack center direction. Therefore, the steering control device should terminate or end the motor limiting mode.

Similarly, If the direction of the steering angle is the negative (−), the direction of the reaction torque of the reaction force motor is negative (−) and the angular velocity direction of the reaction force motor is positive (+), it means that the rack position of the vehicle moves from the threshold range to the normal range, so that the steering control device should terminate or end the motor limiting mode.

The steering control device may generate the control signal for terminating the motor limiting mode and may transmit the control signal to the reaction force motor and the actuator, thereby easily limiting the rack stroke.

According to the steering control method of a steer-by-wire system of the present invention described above, information related to the steering angle of the vehicle and the operation of the reaction force motor and the direction thereof may be determined. In addition, the motor limiting mode may be automatically started or terminated by re-performing the operation of the reaction force motor fixed (stopped) due to the limitation of the rack stroke by using such information and the direction thereof.

Figure 6:
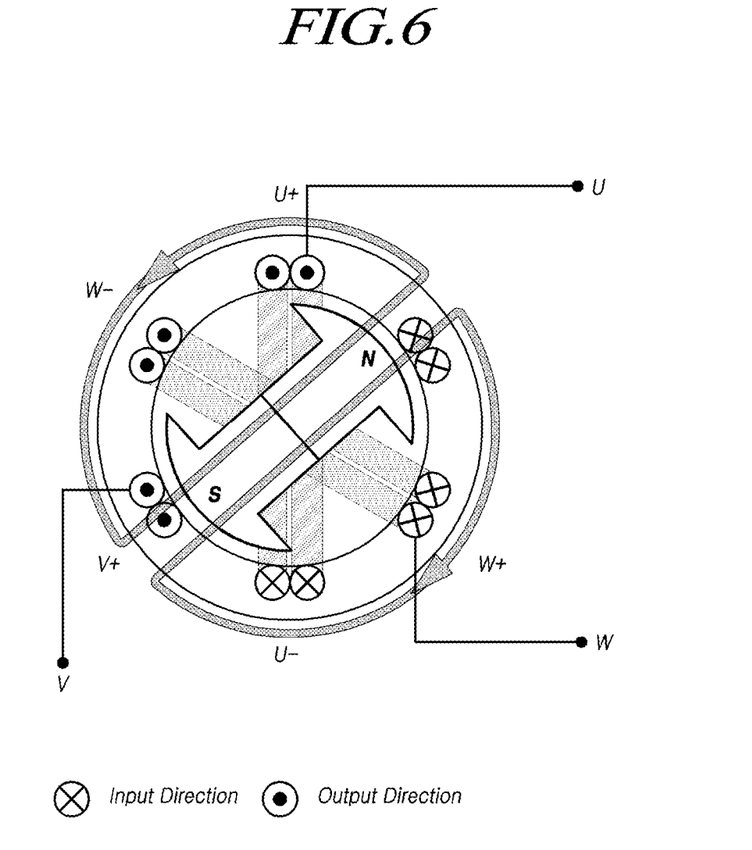
FIGS. 6, 7, and 8 are diagrams illustrating examples of a method for initiating the motor limiting mode in accordance with one embodiment of the present disclosure.
Figure 7:
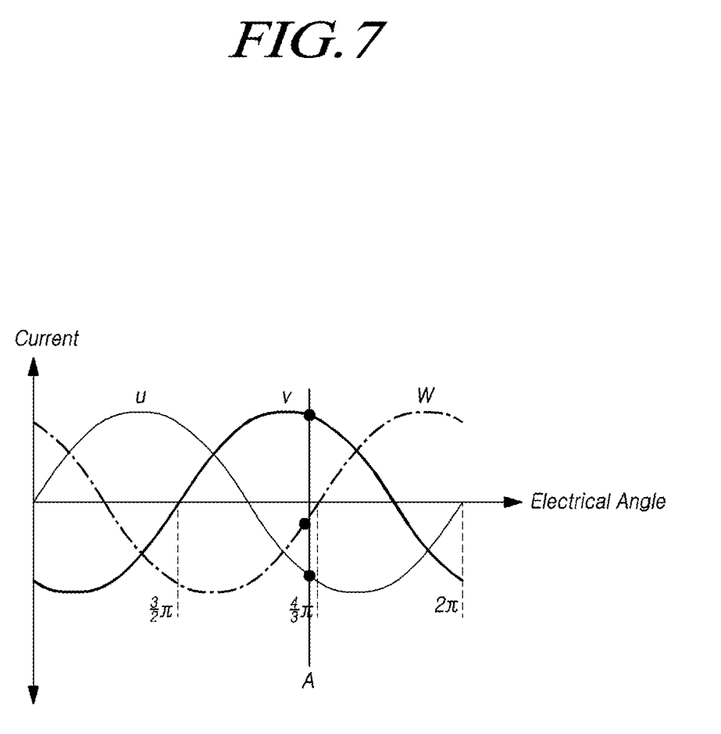
Figure 8:
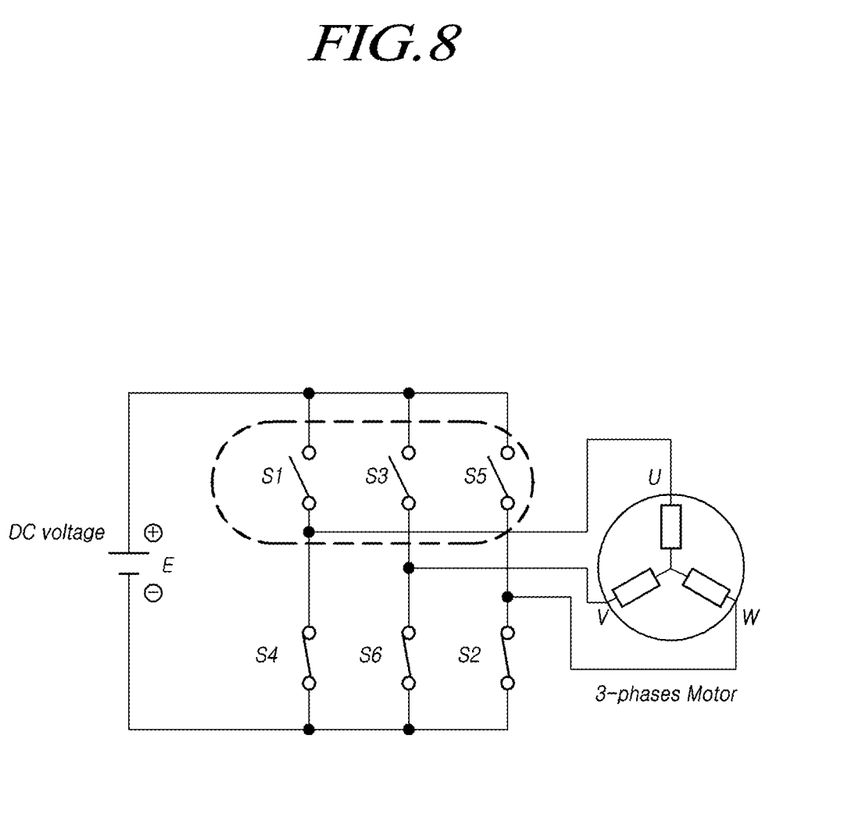

FIGS. 6, 7, and 8 are diagrams illustrating examples of a method for initiating the motor limiting mode in accordance with one embodiment of the present disclosure.

The motor limiting mode according to the present embodiment may be the operation of turning off the three-phase switch of the three-phase reaction force motor or the operation of fixing the electrical angle of the reaction force motor. Specifically, if a current is applied to the three-phase reaction force motor, the reaction force motor may be driven according to the three waveforms that is, the u, v and w waveforms having the phase difference of 120 degrees ($2\pi/3$) according to the electrical angle of the rotor. At this case, if the current value determined by the position angle of the rotor is applied to the reaction force motor, the rotor of the reaction force motor may rotate in the magnitude and direction of the position angle. That is, if the current value according to the determined steering operation is applied to the reaction force motor, the reaction force motor may be driven so as the rotor to rotate by an electrical angle with respect to the current value.

As shown in FIG. 6, ±u, ±v and ±w mean the end and the beginning of the winding of the three-phase bipolar reaction force motor. Here, if the direction of the current changes, the polarity of the magnetic field also changes, so that u, v, and w may change and the rotor of the reaction force motor rotates accordingly.

As described above, in the reaction force motor, the position may be detected by 120 degrees, and the change of the waveform of u, v, w may be determined according to the electrical angle of the reaction force motor. Therefore, if the electrical angle is fixed, the value of the current applied to the reaction force motor may be also fixed, so that the rotor can be fixed. Therefore, the driving of the reaction force motor can be stopped by fixing the electrical angle of the reaction force motor.

Referring to FIG. 7, in order to fix the electrical angle at the A position angle, the current value corresponding to the electrical angle may fixed to the current value corresponding to the three points indicated by the current-electrical angle graph waveform and the current value may be applied to the reaction force motor, so that the operation of the reaction force motor may be stopped.

In a state in which the electrical angle is fixed, that is the operation of the reaction force motor is stopped, if the driver of the vehicle applies a strong force in the direction in which the stopper of the rack collides with the steering wheel, that is, if the driver steers with a strong force within a critical range where the rack stroke is limited, the torque value of the torque sensor may be determined and the magnitude of the current applied to the reaction force motor corresponding to the reaction torque may be increased by a predetermined ratio or gradually increased based on the torque value so that the motor limiting mode can be maintained.

As a result, the amount of the steering assist force may be effectively reduced and the heat generation of the reaction force motor may be reduced. In addition, in the case that the driver of the vehicle operates the steering wheel, it is possible to reduce the driver's sense of difference in the steering assist force due to the motor limiting mode.

FIG. 8 is a circuit diagram of the reaction force motor for explaining an operation of turning off a three-phase switch of the reaction force motor.

Specifically, AC voltages may be selectively applied to three phases u, v and w according to on/off operations of the switches S1 to S6 of the three-phase reaction force motor circuit. At this time, if the order of the switches on/off is changed, the order of u-v, v-w, and w-u phases may change, so that the direction of rotation of the reaction force motor may be changed. At this time, the switching element may be preferably an IGBT (Insulated Gate Bipolar Transistor) semiconductor device, but is not limited thereto.

As shown in FIG. 8, the reaction force motor may maintain the stopped state regardless of the external force by opening (that is, turning off) the switches for the three phases u, v and w of the reaction force motor circuit. This method can stop the reaction force motor with a small current, thereby enabling the motor limiting mode to be executed even when the ignition of the vehicle is turned off.

Accordingly, it is possible to control to start the motor limiting mode in which the operation of the reaction force motor is stopped based on whether the vehicle is started or the steering wheel is requested to be locked.

As described above, steering control apparatus and method of the steer-by-wire system according to the present disclosure, it is possible to provide convenience to the driver by reducing the damage of the vehicle by effectively restricting the rack stroke. Further, there may be provided with the effect of stably controlling the behavior of the vehicle while minimizing the sense of difference in steering due to the operation of the steering wheel.

The above description and the accompanying drawings provide an example of the technical idea of the present invention for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

The scope of protection of the present disclosure should be construed based on the following claims, and all technical ideas within the scope of equivalents thereof should be construed as being included within the scope of the present disclosure.

In addition, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A steering control apparatus of a steer-by-wire system comprising:
    a sensing information collector for collecting at least one of sensing information on a steering or sensing information on a rack;
    a motor operation determiner for determining a start of a motor limiting mode for a reaction force motor and an end of the motor limiting mode for the reaction force motor which provides a reaction torque to a steering wheel based on the collected sensing information, wherein the motor limiting mode is an operation of truning off a three-phase switch of the reaction force motor or fixing an electrical angle of the reaction force motor;
    a control signal generator for generating a control signal corresponding to the start of the motor limiting mode or the end of the motor limiting mode based on the determined result; and
    a control signal output for outputting the generated control signal to the reaction force motor.

2. The steering control apparatus of the steer-by-wire system of claim 1, wherein the sensing information on the steering comprises at least one of reaction torque information of the reaction force motor generated from a torque sensor or a motor position sensor, or steering angle information of the steering wheel generated from a steering angle sensor, and
    the sensing information on the rack comprises at least one of the predetermined rack stroke range information or rack position information generated from a rack position sensor.

3. The steering control apparatus of the steer-by-wire system of claim 2, wherein the motor operation determiner determines a target steering angle and a rack position based on at least one of the steering angle information or the rack position information, and determines a magnitude of a current applied to the reaction force motor and an angular velocity of the reaction force motor based on the reaction torque information.

4. The steering control apparatus of the steer-by-wire system of claim 3, wherein the motor operation determiner controls to start the motor limiting mode if a position of the rack corresponding to the target steering angle is within a threshold range for a rack stroke range.

5. The steering control apparatus of the steer-by-wire system of claim 4, wherein the motor operation determiner controls to terminate the motor limiting mode if the position of the rack is outside the threshold range during execution of the motor limiting mode.

6. The steering control apparatus of the steer-by-wire system of claim 3, wherein the control signal output outputs the control signal for increasing by a predetermined ratio or gradually increasing the magnitude of the current applied to the reaction force motor according to the motor limiting mode.

7. The steering control apparatus of the steer-by-wire system of claim 2, wherein the motor operation determiner determines at least one of a steering angle direction of the steering wheel, or a reaction torque direction and an angular velocity direction of the reaction force motor.

8. The steering control apparatus of the steer-by-wire system of claim 1, wherein the motor operation determiner controls to start the motor limiting mode based on at least one of whether the vehicle is started or whether the steering wheel is requested to be locked.

9. A steering control apparatus of a steer-by-wire system comprising:
    a sensing, information collector for collecting at least one of sensing information on a steering, or sensing information on a rack;
    a motor operation determiner for determining a start of a motor limiting mode for a reaction force motor and an end of the motor limiting mode for the reaction force motor which provides a reaction torque to a steering wheel based on the collected sensing information;
    a control signal generator for generating a control signal corresponding to t start of the motor limiting mode or the end of the motor limiting mode based on the determined result; and
    a control signal output for outputting the generated control signal to the reaction force motor, wherein the m or operation determiner determines at least one of a steering angle direction of the steering wheel, or a reaction torque direction and an angular velocity direction of the reaction force motor, and wherein the motor operation determiner controls to terminate the motor limiting mode if the steering angle direction coincides with the reaction torque direction and the angular velocity direction does not coincide with the reaction torque direction.

10. A steering control method of a steer-by-wire system comprising:
   collecting at least one of sensing information on a steering and sensing information on a rack;
   determining a start of a motor limiting mode for a reaction force motor and an end of the motor limiting mode for the reaction force motor which provides a reaction torque to a steering wheel based on the collected sensing information, wherein the motor limiting mode is an operation of turning off a three-phrase switch of the reaction force motor or of fixing an electrical angle of the reaction force motor;
   generating a control signal corresponding to the start of the motor limiting mode or the end of the motor limiting mode based on the determined result; and
   outputting the generated control signal to the reaction force motor.

11. The steering control method of claim 10, wherein the sensing information on the steering comprises at least one of reaction torque information of the reaction force motor generated from a torque sensor or a motor position sensor, or steering angle information of the steering wheel generated from a steering angle sensor, and
   the sensing information on the rack comprises at least one of the predetermined rack stroke range information or rack position information generated from a rack position sensor.

12. The steering control method of claim 11, further comprising determining at least one of a steering angle direction of the steering wheel, or a reaction torque direction and an angular velocity direction of the reaction force motor.

13. The steering control method of claim 12, wherein the determining of the start of the motor limiting mode for the reaction force motor and the end of the motor limiting mode for the reaction force motor comprises controlling to terminate the motor limiting mode if the steering angle direction coincides with the reaction torque direction and the angular velocity direction does not coincide with the reaction torque direction.

14. The steering control method of claim 11, further comprising:
   determining a target steering angle and a rack position based on at least one of the steering angle information or the rack position information, and
   determining a magnitude of a current applied to the reaction force motor and an angular velocity of the reaction force motor based on the reaction torque information.

15. The steering control method of claim 14, wherein the determining of the start of the motor limiting mode for the reaction force motor and the end of the motor limiting mode for the reaction force motor comprises controlling to start the motor limiting mode if a position of the rack corresponding to the target steering angle is within a threshold range for a rack stroke range.

16. The steering control method of claim 15, wherein the determining of the start of the motor limiting mode for the reaction force motor and the end of the motor limiting mode for the reaction force motor comprises controlling to terminate the motor limiting mode if the position of the rack is outside the threshold range during execution of the motor limiting mode.

17. The steering control method of claim 15, wherein the outputting of the generated control signal comprises outputting the control signal for increasing by a predetermined ratio or gradually increasing the magnitude of the current applied to the reaction force motor according to the motor limiting mode.

18. The steering control method of claim 10, wherein the determining of the start of the motor limiting mode for the reaction force motor and the end of the motor limiting mode for the reaction force motor comprises controlling to start the motor limiting mode based on at least one of whether the vehicle is started or whether the steering wheel is requested to be locked.

\* \* \* \* \*